(No Model.) 2 Sheets—Sheet 2.
J. E. WATTS.
APPARATUS FOR REGULATING TEMPERATURE.
No. 489,052. Patented Jan. 3, 1893.
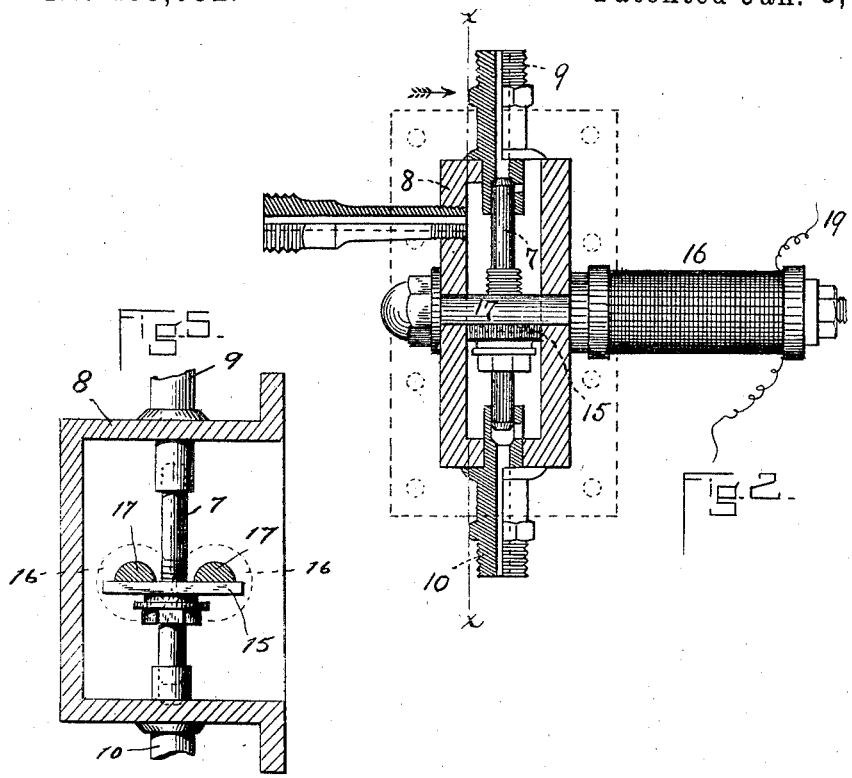
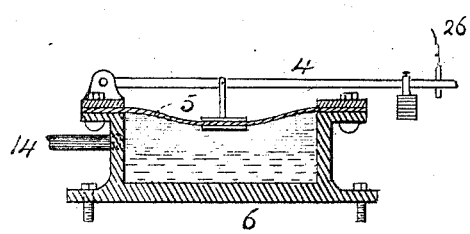
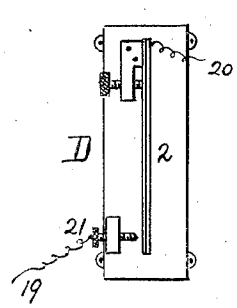
Witnesses.
Francis C. Stanwood
Robt. C. Bridgham
Inventor.
Joseph E. Watts.
by H. E. Lodge Atty.

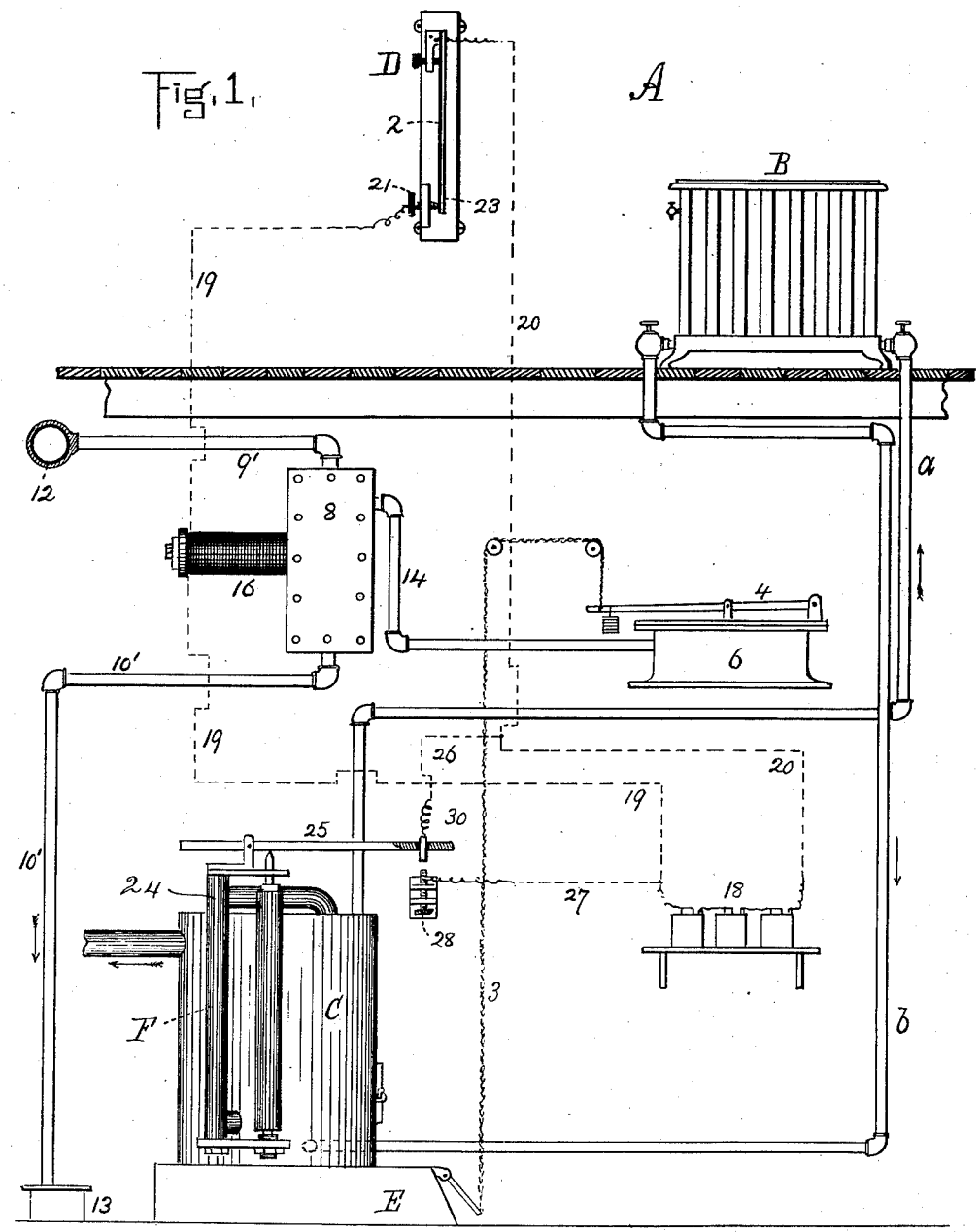

UNITED STATES PATENT OFFICE.

JOSEPH E. WATTS, OF LAWRENCE, MASSACHUSETTS.

APPARATUS FOR REGULATING TEMPERATURE.

SPECIFICATION forming part of Letters Patent No. 489,052, dated January 3, 1893.

Application filed April 23, 1892. Serial No. 430,399. (No model.)

*To all whom it may concern:*

Be it known that I, JOSEPH E. WATTS, a citizen of the United States, residing at Lawrence, in the county of Essex and State of Massachusetts, have invented certain new and useful Improvements in Apparatus for Regulating Temperature; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to apparatus for regulating temperature, and comprises primarily a series of radiators or heat distributers, a thermostat in the apartment where the radiators are located and a heat generating source, as a steam or hot water system; secondly, an electric generator with conducting wires, a damper regulator, composed of a diaphragm with an adjustably weighted lever, and a controlling valve, which has no positive mechanical connections, but is energized and controlled solely by fluid pressure and electrical currents. Moreover in connection with the above elements is a second thermostat for the heat generating agent by means of which the temperature of said heat generator serves to short circuit the electric current and thereby close the damper independently of the temperature in the apartment to be heated. This latter contrivance is to prevent excessive temperature or activity within the generator, which might easily be produced in case the room thermostat demanded a great, sudden, or long continued call for increase in temperature. All these several elements, their relation to each other, together with their respective functions will be hereinafter fully explained and described.

The drawings accompanying this specification represent in Figure 1, a general view of the entire apparatus embodying my invention, showing the relation of the respective instrumentalities. Fig. 2 is an enlarged longitudinal sectional elevation of the independent valve and valve-case, the flanges of the latter being shown in broken lines. Fig. 3 is a vertical section of the diaphragm which controls the damper. Fig. 4 is a front elevation of the room-thermostat indicating its position when a desired temperature has been reached. Fig. 5 is a section of the valve case on line $x$—$x$ Fig. 2.

In the drawings, see Fig. 1, the apartment to be heated is shown at A equipped with a system composed of the usual radiator or radiators B, and supply and return pipes respectively $a$ $b$, which connect with a heat generator C. The latter may be a steam boiler or a hot water system, preferably the latter.

Within the apartment A, and in any desired location is placed a thermostat D: this may be of any approved form or type. In the present instance I use a bimetallic arm or rod 2, in which the metals composing it have unequal coefficients of expansion. Under ordinary existing conditions the room-thermostat D is to control the damper-door E of the heat-generator C.

Extending from the damper-door is a rope or flexible connection 3 suitably hung upon rollers; said rope is secured to the free end of a weighted lever 4 which controls in part but is actuated by the impulses of a diaphragm 5. The latter is to be located by preference in the basement, and is to be actively operated by a valve 7, which in its turn is permitted to move through the agency of the room thermostat D. This valve constitutes one of the prime features of my invention, and consists in a rectangular valve-case 8 adapted to resist high pressures, and preferably of non-magnetic material; longitudinally within said valve-case is the valve 7 which is a cylindrical rod mounted loosely in the extremities of two nipples 9, 10, connecting with pipes 9' 10', said nipples serve as valve-seats in order to allow the valve to perform two offices, one of which is to allow a fluid under pressure to enter the valve-chamber through the pipe 9'. This pipe communicates with a water system 12, in the present instance, as the high service of a city or town. When the valve is in its opposite position fluid under pressure is allowed to escape by way of the pipe 10' to waste or to a trap 13.

Interconnecting the valve case 8 and the diaphragm is a pipe 14. Moreover upon the valve is fastened an iron armature plate 15, which is operated by two electro-magnets 16, the cores 17 of which extend through the

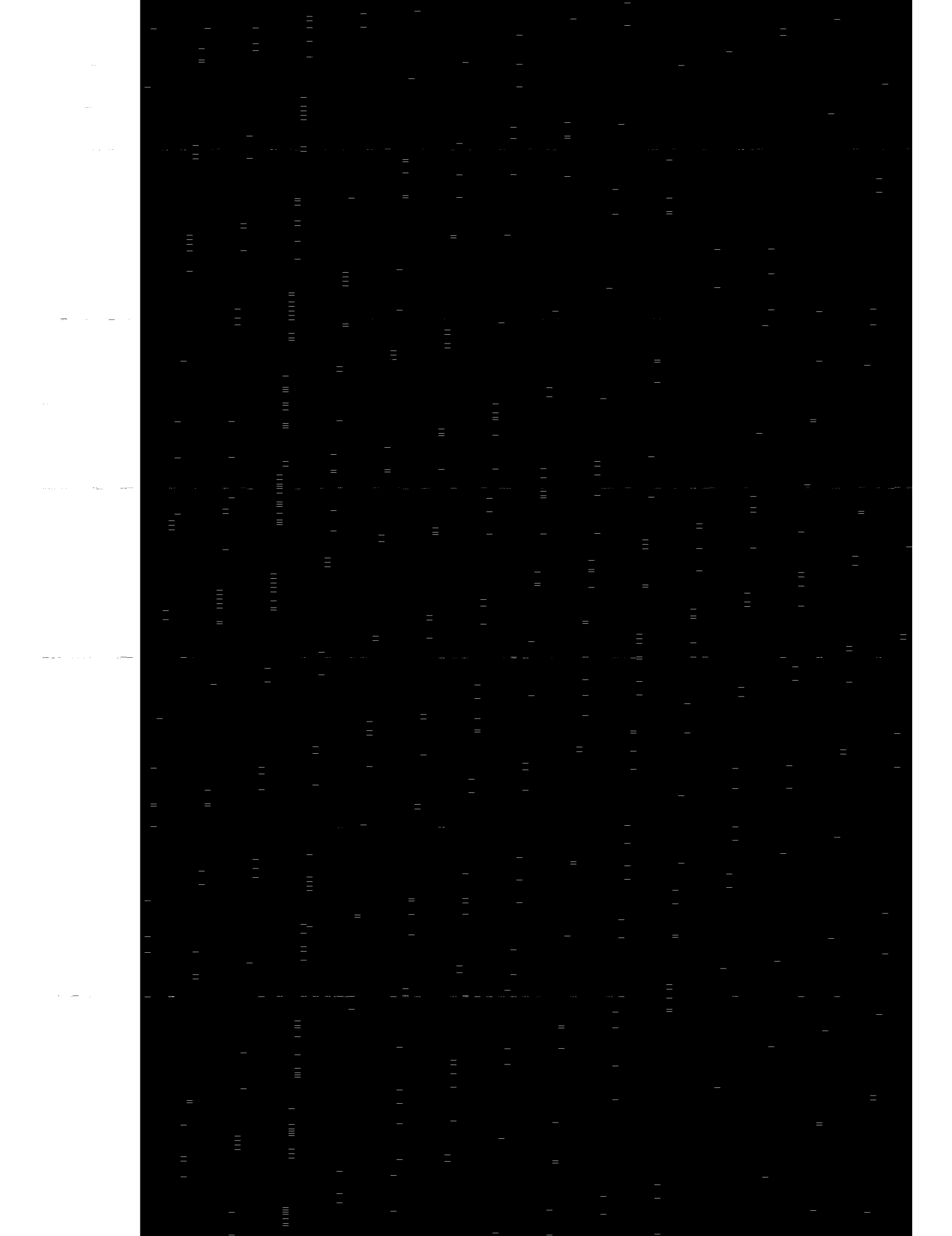

open damper. This relation of elements now continues, until the excessive temperature in the heating source is somewhat modified, when the contraction of the tube 24 allows the lever 25 to break contact with the terminal 28. The short circuit on the loop ceases, the current resumes its course through the magnets, the valve is again moved to open the exhaust pipe 10, the diaphragm and weighted lever 4 drop and the damper door is again opened and so remains until the room thermostat operates it. This is a very convenient and practical method of controlling the independent valve 7 and rendering it operative either for the heat creating source or for the apartment to be supplied with heat.

What I claim is:—

1. In apparatus for regulating temperature, the combination with a series of radiators, a heating agency communicating therewith, a room thermostat, and an operating weighted diaphragm connected with the damper of the heating agency, of a valve loosely mounted upon its bearings and adapted to be operated in one direction by fluid pressure, in the other by electrical energy, and an electric current and circuit therefor which includes the room thermostat, the movement of the independent valve serving to control the pulsations of the diaphragm, substantially as specified and stated.

2. In a temperature regulator, the combination with a loose valve controlled solely by fluid pressure and electrical energy, a room thermostat, a pulsating diaphragm operated by the movement of the independent valve, conducting wires from the current generator interconnecting the room thermostat and electro-magnets which operate in part said valve, of a loop circuit, a second thermostat attached to the heating agency, and a lever operated by the second thermostat to short circuit the current and operate the independent valve by fluid pressure regardless of the room thermostat, substantially as described.

3. In a temperature regulator, a heating agency an electric generator—as a battery—, two conducting wires therefrom, a room thermostat, and one or more electro-magnets likewise in the same circuit, combined with an independent valve, a loop circuit, a second thermostat, and lever upon the heating agency adapted to short circuit the main conducting wires, together with mechanism to operate the damper of the heating agency by movement of the independent valve consequent upon the short circuit, substantially as explained.

4. In apparatus for regulating temperature, the combination with an independent valve, a heating agency, an electric generator, a room thermostat, and conducting wires to the independent valve and room thermostat, of a valve loosely mounted within a valve chamber and provided with an armature, said valve adapted to be alternately reciprocated by electrical energy and fluid pressure, and the interconnecting mechanism whereby the damper of the heating agency is controlled upon movement of the independent valve, substantially as specified.

5. The apparatus for controlling temperature, composed of a room thermostat, an electric generator, a heat creating and distributing agency, a weighted diaphragm to control the damper of the heating agency, an independent valve, and a fluid pressure system communicating with the diaphragm, together with means for electrically operating the independent valve to actuate the diaphragm and close the damper, as likewise with means to operate the independent valve by fluid pressure and thereby open the damper, substantially as herein set forth and stated.

6. The combination with a heating agency, a weighted diaphragm, an electric generator, and suitable conducting wires, of a valve chamber, supply and exhaust pipes therefrom, a loosely mounted armature-equipped valve therein to open and close said pipes, electro-magnets controlled by the room thermostat together with means to unite said diaphragm with the valve chamber, substantially as set forth.

7. In apparatus for regulating temperature, heat generating and distributing agencies, a room thermostat, an electric generator, conducting wires to a valve operated by said room-thermostat, combined with a second thermostat actuated by the heat generating agency, and a loop-circuit to weaken the main current, and thereby render the room-thermostat inoperative to prevent the heating agency from exceeding the limits of safety, substantially as specified.

In testimony whereof I affix my signature in presence of two witnesses.

JOSEPH E. WATTS.

Witnesses:
WILKINSON SHACKLETON,
H. E. LODGE.